United States Patent
Mori et al.

(10) Patent No.: US 8,061,475 B2
(45) Date of Patent: Nov. 22, 2011

(54) SOUNDPROOF COVER AND METHOD FOR PRODUCING THE SAME

(75) Inventors: Tadashi Mori, Tokyo (JP); Motonori Kondoh, Tokyo (JP); Kaname Arimizu, Tokyo (JP); Takahiro Niwa, Tokyo (JP); Masaki Yoshihara, Tokyo (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 12/884,915

(22) Filed: Sep. 17, 2010

(65) Prior Publication Data
US 2011/0067949 A1 Mar. 24, 2011

(30) Foreign Application Priority Data
Sep. 18, 2009 (JP) ................ P.2009-217003

(51) Int. Cl.
*G10K 11/00* (2006.01)
(52) U.S. Cl. ........ 181/205; 181/210; 181/284; 181/286; 181/290
(58) Field of Classification Search .................. 181/210, 181/284, 286, 290, 205
See application file for complete search history.

(56) References Cited

U.S. PATENT DOCUMENTS

| | | | |
|---|---|---|---|
| 5,180,619 A | 1/1993 | Landi et al. | |
| 7,677,358 B2 * | 3/2010 | Tocchi et al. | 181/290 |
| 7,770,692 B2 * | 8/2010 | Hazelton et al. | 181/290 |
| 7,789,197 B2 * | 9/2010 | Duval et al. | 181/290 |
| 2006/0124388 A1 * | 6/2006 | Pompei | 181/290 |
| 2006/0151239 A1 * | 7/2006 | Albin | 181/290 |
| 2008/0128201 A1 * | 6/2008 | Yamaguchi et al. | 181/286 |
| 2008/0257641 A1 | 10/2008 | Tocchi et al. | |
| 2010/0224438 A1 * | 9/2010 | Schulze et al. | 181/204 |

FOREIGN PATENT DOCUMENTS

| | | | |
|---|---|---|---|
| JP | 55104528 A | * | 8/1980 |
| JP | 10-205352 | | 8/1998 |
| JP | 2006-098966 | | 4/2006 |

OTHER PUBLICATIONS

Nagamatsu, Akio, "Generation Mechanism of Viscosity by Energy Principle", Automotive Technology, vol. 63, No. 7, 2009, pp. 56-61.

* cited by examiner

*Primary Examiner* — Forrest M Phillips
(74) *Attorney, Agent, or Firm* — Nixon & Vanderhye P.C.

(57) ABSTRACT

The present invention relates to a soundproof cover containing: a sound-absorbing material disposed facing to a sound source; a soft sound-insulating layer laminated on the sound-absorbing material and having an air permeability measured according to JIS L 1018 (1999) of 10 cc/cm²·sec or less; and a soft cover forming an air layer with the soft sound-insulating layer and having a Young's modulus measured according to JIS K 7127 (1999) of 0.2 to 1.5 GPa, in which the air layer is hermetically sealed.

6 Claims, 5 Drawing Sheets

SOUND SOURCE

FIG. 1

SOUND SOURCE

FIG. 2

SOUND SOURCE

FIG. 3

SOUND SOURCE

SOUNDPROOF COVER AND METHOD FOR PRODUCING THE SAME

TECHNICAL FIELD

The present invention relates to a soundproof cover to be fitted, for example, to automobile engines, transmissions and driving systems.

BACKGROUND ART

There are a large number of sound sources in an automobile. From the viewpoint of the demand for quietness away from automotive inside and outside noises, various soundproof measures have been taken. In particular, with regard to the components (intrinsic noise sources) that generate loud sounds, such as engines, transmissions and driving systems, soundproof measures are required in the positions near to the sound sources. Thus, a dedicated soundproof cover excellent in sound-absorbing and insulating performance is used. The demand for noise-reducing components in automobiles is very high, combined with that automotive outside noise level regulations are tightened by a series of legal changes and that a reduction in automotive inside noise is directly linked to a car value (a touch of class). In particular, an automotive outside noise regulation scheduled to be introduced in the European Union in 2013 is finally as severe as −3 dB to the conventional regulation value (it is necessary to be reduced to one half in terms of sound pressure energy). This essentially requires noise reduction measures against the intrinsic noise sources such as basic engines as main noise emitting sources in engine rooms and transmissions. Although various soundproof components such as engine top covers on the side of upper surfaces of engines have hitherto been used, however, further improvement in performance and weight saving from the viewpoint of a decrease in fuel consumption have been demanded.

Conventional soundproof covers are designed with putting the principal objective thereof to insulation of direct noise from the intrinsic noise sources, and are each constructed so that a sound-absorbing material is post-attached to the intrinsic noise source side of a rigid cover formed by molding a metal or a resin such as polyamide or polypropylene, or to a part thereof (see Patent Document 1). However, the sound-insulating performance of such a soundproof cover conforms to the mass law, and depends on the weight of the rigid cover. It is therefore impossible to comply with the needs for weight saving. Further, in the case where the intrinsic noise source is accompanied by vibration, even when the vibration is transmitted from fixing points and the like for attaching the soundproof cover to the engine and the like, the rigid cover hardly undergoes oscillatory deformation, and hence an effect of damping the vibration as kinetic energy is not obtained. Accordingly, secondary emission occurs from a rigid noise insulating layer to deteriorate the noise level rather than to improve it in some cases.

Moreover, regarding the evaluation of noises inside and outside an automobile, since the noise level itself is an amount of sense of human, a sound pressure level (dB) obtained by logarithmically compressing an observed sound pressure is used as an evaluation criterion close to an amount of the sound sensed by human. However, when a four (multi)-directional average (combination sound) which is generally employed in a case of evaluating a general soundproofing effect (the increase or decrease in sound pressure level) is calculated, the sound pressure level is affected by the largest sound of all the measured sounds because of the characteristic of the dB sum calculation. Therefore, even though the sound pressure level in only one direction in which a sound proof measure has been taken is reduced, the soundproof effect could not be attained as a whole with the result that the sound pressure level as the level of human sense to sound could not be lowered in some cases. Accordingly, it is necessary to thoroughly and uniformly reduce the sound pressure level in every direction.

However, with the soundproof cover disclosed in Patent Document 1 constructed by attaching a sound-absorbing material to a rigid cover, the rigid cover may be resonant with vibration transmission (solid-borne sounds) in case where the intrinsic noise sources vibrate, thereby generating noises by itself to be a new noise emitting source (secondary emission). In general, therefore, the soundproof cover must be fixed to the intrinsic noise sources via a vibration-insulating material such as rubber bush. Necessarily, therefore, there occurs a gap between the peripheral edge of the soundproof cover and the intrinsic noise source, and there may be caused where inner reverberationg sounds (standing waves) leak out from the gap and the sound level reduction cannot be attained.

From such a background, for the purpose of taking measures against solid-borne sounds in the case where the intrinsic noise sources vibrate or inner reverberating sounds (standing waves) of a soundproof cover, there has been proposed a soundproof cover, in which a soft sound-insulating layer formed of a nonwoven fabric coated with a vibration-damping resin is provided, in place of a rigid cover, on a surface of a sound-absorbing material on the opposite side of an intrinsic noise source (see Patent Document 2).

However, the soundproof cover described in Patent Document 2 has a limitation in its mass from a manufacturing problem of the soft sound-insulating layer, and is inferior in sound-insulating performance in a high-frequency region of 4 kHz or more to the high-mass rigid cover.

[Patent Document 1] JP-A-10-205352
[Patent Document 2] JP-A-2006-98966

SUMMARY OF THE INVENTION

It is therefore an object of the invention to provide a lightweight soundproof cover more excellent in soundproof performance than conventional ones. Other objects and effects of the invention will become apparent from the following description.

In order to achieve the above mentioned object, the present invention provides the following soundproof cover, method for producing the same, and sound reduction method.

(1) A soundproof cover containing:

a sound-absorbing material disposed facing to a sound source;

a soft sound-insulating layer laminated on the sound-absorbing material and having an air permeability measured according to JIS L 1018 (1999) of 10 cc/cm$^2$·sec or less; and a soft cover forming an air layer with the soft sound-insulating layer and having a Young's modulus measured according to JIS K 7127 (1999) of 0.2 to 1.5 GPa, in which the air layer is hermetically sealed.

(2) The soundproof cover according to the above (1), in which the soft sound-insulating layer has a Young's modulus measured according to JIS K 7127 (1999) of ⅕ or less that of the soft cover.

(3) The soundproof cover according to the above (1) or (2), in which the soft cover and the soft sound-insulating layer have peripheral edges which are in contact with each other, and the peripheral edges are pressure-bonded with each other.

(4) The soundproof cover according to the above (1) or (2), in which the soft cover and the soft sound-insulating layer have peripheral edges which are connected to each other, directly or with a sealing material.

(5) A method for producing a soundproof cover including the steps:

shaping a soft cover having a Young's modulus measured according to JIS K 7127 (1999) of 0.2 to 1.5 GPa;

shaping a laminate of a sound-absorbing material and a soft sound-insulating layer having an air permeability measured according to JIS L 1018 (1999) of 10 cc/cm$^2$·sec or less;

overlaying the laminate over the soft cover so that the soft sound-insulating layer faces to the soft cover, thereby forming an air layer between the soft sound-insulating layer and the soft cover; and connecting the soft cover to the soft sound-insulating layer at peripheral edges thereof.

(6) A sound reduction method including disposing the soundproof cover according to any one of the above (1) to (4) on an engine in an engine room of an automobile, so that the sound-absorbing material contacts with the engine.

The soundproof cover of the invention damps vibration of a sound entering in a sound-absorbing material disposed facing to a sound source by means of a soft sound-insulating layer having a low Young's modulus and easily deformed by vibration, then, further damps the vibration at the time of transmission in an air layer, and finally insulates the sound by means of a soft cover formed as an uppermost surface layer. Moreover, the air layer is hermetically sealed, and there is also no leakage of sound from the air layer. Further, no secondary emission occurs, and also the soundproof cover becomes lightweight, because the soft cover is used in place of a conventional rigid cover.

DESCRIPTION OF REFERENCE NUMERALS AND SIGNS

| | |
|---|---|
| 1, 2, 3 | soundproof cover |
| 4 | sound-absorbing material |
| 5 | soft sound-insulating layer |
| 6 | soft cover |
| 7 | sealing material |
| 8 | air layer |
| 9 | air-permeable material |
| 10 | hot press adhesion |

MODE FOR CARRYING OUT THE INVENTION

The invention will be described in detail below with reference to the drawings but the invention should not be construed as being limited thereto.

Figure 1:
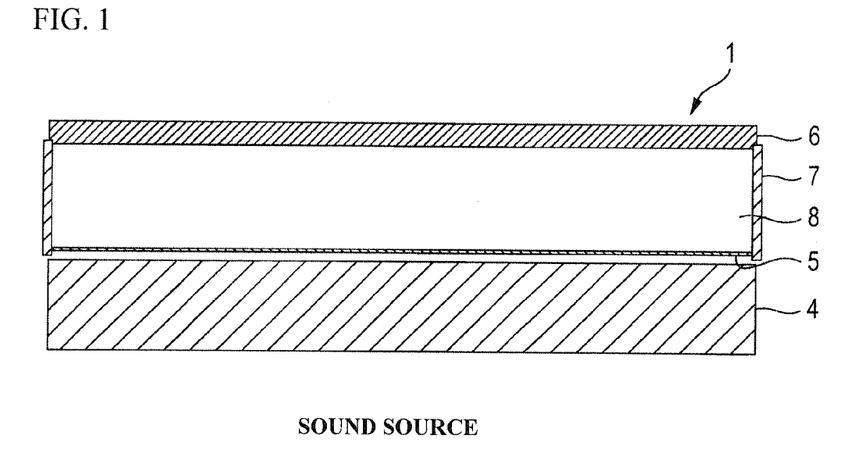
FIG. 1 is a cross-sectional view showing one example of the soundproof cover of the invention.

FIG. 1 is a cross-sectional view showing one example of the soundproof cover of the invention. As shown in the drawing, a sound-absorbing material 4 is disposed facing to a sound source (the under side in the drawing), and a soft sound-insulating layer 5 is attached to a surface thereof on the opposite side of the sound source. Further, a soft cover 6 is laid over the soft sound-insulating layer 5 with a specified gap, and an air layer 8 is formed between the soft sound-insulating layer 5 and the soft cover 6. Then, a peripheral edge of the soft sound-insulating layer 5 is connected to that of the soft cover 6 by a sealing material 7, thereby hermetically sealing the air layer 8. The sound sources as used herein include an engine mounted in an automobile engine room, a transmission, a driving system, a motor, compressor and a generator. Further, the soundproof cover of the invention is suitably applicable to an engine particularly accompanied by strong vibration.

There is no limitation on the sound-absorbing material 4, and there can be used a porous material having a basis weight of preferably 100 to 5,000 g/m$^2$, and more preferably 200 to 1,500 g/m$^2$. Such porous materials include, for example, common porous sound-absorbing materials such as glass wool, rock wool, rock wool long fibers ("Basalt Fiber" manufactured by Chubu Kougyou Co., Ltd., etc.), polyurethane foam, polyethylene foam, polypropylene foam, phenolic foam, melamine foam, open cellular foamed ones of such as nitrile-butadiene rubber, chloroprene rubber, styrene rubber, silicone rubber, urethane rubber and EPDM, or open cellular foamed ones produced by making holes in foam cells by crushing or the like after foaming thereof, polyester fiber felt such as polyethylene terephthalate fiber felt, nylon fiber felt, polyethylene fiber felt, polypropylene fiber felt, acrylic fiber felt, silica-alumina ceramic fiber felt, silica fiber felt ("Siltex" manufactured by Nichias Corporation, etc.), and ones (generic name: resin felt) obtained by processing cotton, wool, wood, waste fibers and the like into a felt form with thermosetting resin.

Further, for the purposes of preventing fibers or the like from scattering and of improving the appearance of products, thermoplastic resin long fibers such as polyethylene long fibers, polypropylene long fibers, nylon long fibers, tetrone long fibers, acrylic long fibers, rayon long fibers, vinylon long fibers, fluororesin long fibers such as polyvinylidene fluoride long fibers or polytetrafluoroethylene long fibers, polyester long fibers such as polyethylene terephthalate, and two-layered long fibers in which polyester long fibers are coated with polyethylene resin, either singly or as a mixture thereof, may be shaped into a thin sheet form according to a spun-bonding method, and the resulting thin and flexible nonwoven fabric sheet having a basis weight of 15 to 150 g/m$^2$ may also be stuck to a surface (a lower surface in the drawing) of the sound absorbing material on the sound source side. The "long fiber" referred to herein means, for example, an organic or inorganic fiber having an average fiber length of exceeding 51 mm, and may be also called a continuous fiber.

For the soft cover 6, the Young's modulus is limited to the range of 0.2 to 1.5 GPa, preferably 0.5 to 1.2 GPa. The Young's modulus is a value measured based on JIS K 7127 (1999). When the Young's modulus is less than 0.2 GPa, the difference in flexibility from the soft sound-insulating layer 5 is small, resulting in a failure to obtain a sufficient air spring effect. On the other hand, when the Young's modulus exceeds 1.5 GPa, the flexibility (H) represented by the reciprocal of the Young's modulus (elastic modulus) becomes too small, and the vibration from the sound source is transmitted through fixing points and the like for attaching the soundproof cover to the engine and the like. Accordingly, the soft cover 6 cannot sufficiently absorb solid-borne sounds (vibration) as mechanical energy (½·Hf2: f is a value that represents the vibration of the soft cover 6 as force), resulting in the occurrence of secondary emission from the surface. Incidentally, for the absorption of the solid-borne sounds, reference can be made to "Generating Mechanism of Viscosity by Energy Principle" (Automotive Technology, vol. 63, pp. 55-61 (2009)), and the like.

Further, the soft cover 6 is preferably non-air-permeable, and it is preferably to have an air permeability of 10 cc/cm²·sec or less, more preferably 0.001 to 10 cc/cm²·sec and further preferably 0.01 to 1 cc/cm²·sec. Incidentally, the air permeability is a value measured according to JIS L 1018 (1999).

The soft cover 6 has no limitation on the material thereof as long as the above-mentioned Young's modulus and preferably, air permeability are satisfied. However, there can be used a nonwoven fabric, a cloth, a laminate film, a rubber sheet, a resin film, a vibration-damping resin, a vibration-damping rubber, a laminate obtained by appropriately laminating them, or a nonwoven fabric or cloth coated with the vibration-damping resin. Specifically, the soft covers include materials described in the following items A to H. Then, these materials are formed into a specified form to obtain the soft cover 6. Further, when the nonwoven fabric or the cloth is used, the soft cover 6 is disposed in such a manner that the nonwoven fabric or the cloth is located as an outermost layer surface.

A. A material obtained by forming a nonwoven fabric by shaping thermoplastic resin long fibers, such as polyethylene long fibers, polypropylene long fibers, nylon long fibers, tetrone long fibers, acrylic long fibers, rayon long fibers, vinylon long fibers, fluororesin long fibers such as polyvinylidene fluoride long fibers or polytetrafluoroethylene long fibers, polyester long fibers such as polyethylene terephthalate long fibers, or two-layered long fibers in which polyester long fibers are coated with polyethylene resin, either singly or as a mixture thereof, into a thin sheet form according to a spun-bonding method, and coating the nonwoven fabric with a resin or a rubber having a loss tangent peak within a temperature range of room temperature (20° C.) to 150° C. and having vibration-damping properties, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber or fluorosilicone rubber, on one or both surfaces thereof, by spraying or roller coating, thereby selectively forming a vibration-damping resin film or a vibration-damping rubber film on the surface of the nonwoven fabric.

B. A material obtained by forming a nonwoven fabric by shaping thermoplastic resin short fibers, such as polyethylene short fibers, polypropylene short fibers, nylon short fibers, tetrone short fiber, acrylic short fibers, rayon short fibers, vinylon short fibers, fluororesin short fibers such as polyvinylidene fluoride short fibers or polytetrafluoroethylene short fibers, polyester short fibers such as polyethylene terephthalate, two-layered short fibers in which polyester short fibers are coated with polyethylene resin, or natural short fibers made of a natural material such as wool, cotton, wood or kenaf fibers, either singly or as a mixture thereof, into a thin sheet form according to a method such as chemical bonding, thermal bonding, stitch bonding or needle punching, and coating the nonwoven fabric with a resin or a rubber having a loss tangent peak within a temperature range of room temperature (20° C.) to 150° C. and having vibration-damping properties, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber or fluorosilicone rubber, on one or both surfaces thereof, by spraying or roller coating, thereby selectively forming a vibration-damping resin film or a vibration-damping rubber film on the surface of the nonwoven fabric. The "short fiber" referred to herein means, for example, an organic or inorganic fiber having an average fiber length of 1 to 51 mm.

C. A material obtained by preparing a nonwoven fabric by shaping glass fibers, rock wool fibers, rock wool long fibers ("Basalt Fiber" manufactured by Chubu Kougyou Co., Ltd., etc.), silica fibers ("Siltex" manufactured by Nichias Corporation, etc.), silica-alumina ceramic fibers, alumina fibers, whiskers such as silicon carbide whiskers or the like, either singly or as a mixture thereof, into a thin sheet form according to chemical bonding with a binder (for example, urea-modified phenol resin or the like) in a weight ratio of 10% or less, and coating the nonwoven fabric with a resin or a rubber having a loss tangent peak within a temperature range of room temperature (20° C.) to 150° C. and having vibration-damping properties, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber or fluorosilicone rubber, on one or both surfaces thereof, by spraying or roller coating, thereby selectively forming a vibration-damping resin film or a vibration-damping rubber film on the surface of the nonwoven fabric.

D. A material obtained by forming a nonwoven fabric laminate by laminating the nonwoven fabric of the above A formed by shaping thermoplastic resin long fibers, such as polyethylene long fibers, polypropylene long fibers, nylon long fibers, tetrone long fibers, acrylic long fibers, rayon long fibers, vinylon long fibers, fluororesin long fibers such as polyvinylidene fluoride long fibers or polytetrafluoroethylene long fibers, polyester long fibers such as polyethylene terephthalate long fibers, or two-layered long fibers in which polyester long fibers are coated with polyethylene resin, either singly or as a mixture thereof, into a thin sheet form according to a spun-bonding method, or the nonwoven fabric of the above C prepared by shaping glass fibers, rock wool fibers, silica fibers ("Siltex" manufactured by Nichias Corporation, etc.), silica-alumina ceramic fibers, alumina ceramic fibers, whiskers such as silicon carbide whiskers or the like, either singly or as a mixture thereof, into a thin sheet form according to chemical bonding with a binder (for example, urea-modified phenol resin or the like) in a weight ratio of 10% or less, with the nonwoven fabric of the above B formed by shaping thermoplastic resin short fibers, such as polyethylene short fibers, polypropylene short fibers, nylon short fibers, tetrone short fibers, acrylic short fibers, rayon short fibers, vinylon short fibers, fluororesin short fibers such as polyvinylidene fluoride short fibers or polytetrafluoroethylene short fibers, polyester short fibers such as polyethylene terephthalate, two-layered short fibers in which polyester short fibers are coated with polyethylene resin, or natural short fibers made of a natural material such as wool, cotton, wood or kenaf fibers, either singly or as a mixture thereof, into a thin sheet form according to a method such as chemical bonding, thermal bonding, stitch bonding or needle punching, and coating the nonwoven fabric laminate with a resin or a rubber having a loss tangent peak within a temperature range of room temperature (20° C.) to 150° C. and having vibration-damping properties, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber or fluorosilicone rubber, on one or both surfaces thereof, by spraying or roller coating, thereby selectively forming a vibration-damping resin film or a vibration-damping rubber film on the surface of the nonwoven fabric laminate.

E. A material obtained by forming a cloth by weaving thermoplastic resin long fibers, such as polyethylene long fibers, polypropylene long fibers, nylon long fibers, tetrone long fibers, acrylic long fibers, rayon long fibers, vinylon long fibers, fluororesin long fibers such as polyvinylidene fluoride long fibers or polytetrafluoroethylene long fibers, polyester long fibers such as polyethylene terephthalate long fibers, or two-layered long fibers in which polyester long fibers are coated with polyethylene resin, or thermosetting resin long fibers such as phenol resin fibers ("Kynol" manufacture by Nippon Kynol Inc., etc.), either singly or as a mixture thereof, by a method such as plane weaving or twill weaving, and coating the cloth with a resin or a rubber having a loss tangent peak within a temperature range of room temperature (20° C.) to 150° C. and having vibration-damping properties, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber or fluorosilicone rubber, on one or both surfaces thereof, by spraying or roller coating, thereby selectively forming a vibration-damping resin film or a vibration-damping rubber film on the surface of the cloth.

F. A material obtained by forming a cloth by weaving glass long fibers, rock wool long fibers ("Basalt Fiber" manufactured by Chubu Kougyou Co., Ltd., etc.), silica fibers ("Siltex" manufactured by Nichias Corporation, etc.), silica-alumina ceramic fibers or alumina fibers, either singly or as a mixture thereof, by a method such as plane weaving or twill weaving, and coating the cloth with a resin or a rubber having a loss tangent peak within a temperature range of room temperature (20° C.) to 150° C. and having vibration-damping properties, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber or fluorosilicone rubber, on one or both surfaces thereof, by spraying or roller coating, thereby selectively forming a vibration-damping resin film or a vibration-damping rubber film on the surface of the cloth.

G. A material obtained by forming a cloth by weaving mixed long fibers of organic long fibers, for example, thermoplastic resin long fibers such as polyethylene long fibers, polypropylene long fibers, nylon long fibers, tetrone long fibers, acrylic long fibers, rayon long fibers, vinylon long fibers, fluororesin long fibers such as polyvinylidene fluoride long fibers or polytetrafluoroethylene long fibers, polyester long fibers such as polyethylene terephthalate, or two-layered long fibers in which polyester long fibers are coated with polyethylene resin, or thermosetting resin long fibers such as phenol resin fibers ("Kynol" manufacture by Nippon Kynol Inc., etc.) as described in the above E and inorganic long fibers such as glass long fibers, rock wool long fibers ("Basalt Fiber" manufactured by Chubu Kougyou Co., Ltd., etc.), silica fibers ("Siltex" manufactured by Nichias Corporation, etc.), silica-alumina ceramic fibers or alumina fibers as described in the above F, by a method such as plane weaving or twill weaving, and coating the cloth with a resin or a rubber having a loss tangent peak within a temperature range of room temperature (20° C.) to 150° C. and having vibration-damping properties, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber or fluorosilicone rubber, on one or both surfaces thereof, by spraying or roller coating, thereby selectively forming a vibration-damping resin film or a vibration-damping rubber film on the surface of the cloth.

H. A material obtained by processing a resin such as polyethylene resin, polypropylene resin, polyamide resin such as nylon 6, nylon 66, nylon 11, nylon 12, nylon 610 or nylon 612, acrylic resin, rayon resin, vinylon resin, fluororesin such as polyvinylidene fluoride resin or polytetrafluoroethylene resin, polyester resin such as polyethylene terephthalate, furan resin, diallyl phthalate resin, bismaleimide-triazine resin, phenolic resin, urea resin, melamine resin, alkyd resin, epoxy resin, cellulose resin, polyurethane resin, ethylene-vinyl acetate copolymer resin, chlorinated polyethylene resin, polystyrene resin, ABS resin, polyvinyl chloride resin, polyvinylidene chloride resin, methacrylic resin, polyamideimide resin, polyisobutylene resin, polycarbonate resin, polyvinyl acetate resin, polymethylpentene resin, polyphenylene oxide resin, polyphenylene sulfide resin, polyacetal resin or polyether sulfone resin, or a rubber such as natural rubber, isoprene rubber, butyl rubber, styrene rubber, chloroprene rubber, nitrile rubber, fluororubber, acrylic rubber, silicone rubber, ethylene-propylene rubber or fluorosilicone rubber.

Although there is no particular limitation on the mass of the soft cover 6, it is preferably from 200 to 5,000 g/m$^2$, and more preferably from 400 to 1,500 g/m$^2$. Further, although there is no particular limitation on the thickness of the soft cover 6, it is preferably from 0.5 to 5 mm, and more preferably from 1 to 3 mm.

The soft sound-insulating layer 5 is preferably non-air-permeable, and it is necessary to have an air permeability of 10 cc/cm$^2$·sec or less, preferably 0.001 to 10 cc/cm$^2$·sec and more preferably 0.01 to 1 cc/cm$^2$·sec. Further, the soft sound-insulating layer 5 is required to be more flexible, in order to damp the vibration of the sound transmitted through the sound-absorbing material 4 by deformation of the soft sound-insulating layer 5 itself, and the Young's modulus thereof is preferably ⅕ or less that of the soft cover 6, and more preferably ⅒ or less. Specifically, the Young's modulus of the soft sound-insulating layer is preferably from 0.01 to 0.5 GPa, and more preferably from 0.02 to 0.12 GPa.

Further, the soft sound-insulating layer 5 has no limitation on the material thereof, as long as the above-mentioned air permeability and preferably, Young's modulus are satisfied. There can be used a nonwoven fabric, a cloth, a laminate film, a rubber sheet, a resin film, a vibration-damping resin, a vibration-damping rubber, a laminate in which these are appropriately combined, or a nonwoven fabric or cloth coated with a vibration-damping resin. A thin sheet or film composed of A to H mentioned in the soft cover 6 can also be used. In that case, the thickness is thinned, thereby regulating the Young's modulus within the above-mentioned range. Specifically, when the thickness of the soft cover 6 is from 0.5 to 5 mm, the soft sound-insulating layer 5 may be set to a thickness of 25 to 100 µm.

The sealing material 7 is a sheet or film composed of a non-air-permeable soft material, and there can be used, for example, an elastic material having a loss tangent peak within a temperature range of room temperature (20° C.) to 150° C., such as an elastomer having a Young's modulus of 0.1 to 0.5 GPa such as acrylic rubber, natural rubber, nitrile-butadiene rubber (NBR), styrene-butadiene rubber (SBR), ethylene-propylene rubber (EPDM), chloroprene rubber, silicone rubber, isoprene rubber or fluororubber, or a thermoplastic elastomer such as polypropylene-EPDM blend polymer (TPO), polystyrene-polybutadiene copolymer (SBC) or polyetherurethane-polyesterurethane copolymer (TPU); or a flexible hot-melt film formed from a resin having low molecular weight, such as polyamide 12 resin, polyurethane resin, polyester resin and polyethylene-vinyl acetate resin.

Figure 2:
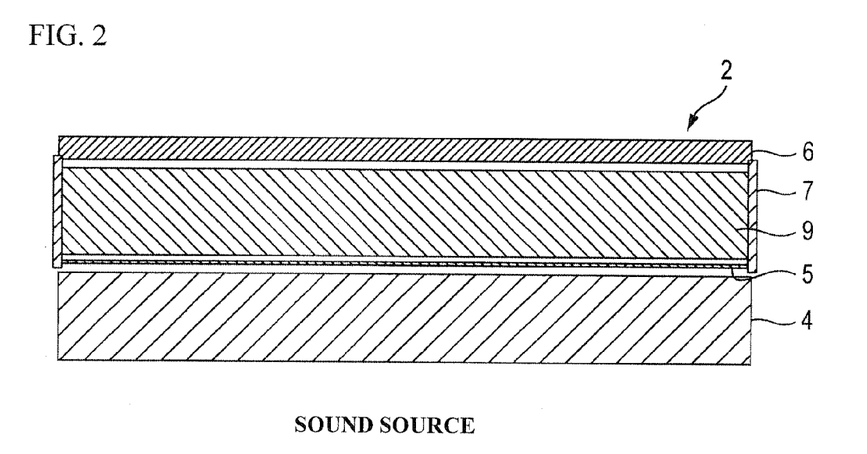
FIG. 2 is a cross-sectional view showing another example of the soundproof cover of the invention.

The air layer 8 is confined between the soft cover 6 and the soft sound-insulating layer 5, and hermetically sealed. Further, as shown in FIG. 2, the air layer 8 may be filled with an air-permeable material 9. Even when the air layer 8 is filled with the air-permeable material 9, there is little difference in sound-insulating performance due to the soft cover 6, and there is obtained such an advantage that shape-retaining properties as the whole soundproof cover are improved.

There is no particular limitation on the material for such an air-permeable material, as long as it is not so hard as to directly transmit the vibration, and a porous material having a basis weight of 50 to 500 g/m² can be used. Such porous materials include, for example, glass wool, rock wool, rock wool long fibers ("Basalt Fiber" manufactured by Chubu Kougyou Co., Ltd., etc.), polyurethane foam, polyethylene foam, polypropylene foam, phenolic foam, melamine foam, open cellular foamed ones such as nitrile-butadiene rubber, chloroprene rubber, styrene rubber, silicone rubber, urethane rubber and EPDM, or open cellular foamed ones produced by making holes in foam cells by crushing or the like after foaming thereof, polyester fiber felt such as polyethylene terephthalate fiber felt, nylon fiber felt, polyethylene fiber felt, polypropylene fiber felt, acrylic fiber felt, silica-alumina ceramic fiber felt, silica fiber felt ("Siltex" manufactured by Nichias Corporation, etc.), and ones (generic name: resin felt) obtained by processing cotton, wool, wood, waste fibers and the like into a felt form with thermosetting resin.

The soundproof cover of the invention can decrease the basis weight to preferably 800 to 2,000 g/m², more preferably to 800 to 1,500 g/m², and further preferably 1,000 to 1,500 g/m² by the above-mentioned constitution. By the way, considering that the basis mass of the conventional soundproof cover provided with the rigid cover exceeds 5,000 g/m², the mass of the soundproof cover of the invention can be reduced to ½ or less, compared to the conventional product. Such weight saving contributes to an improvement in fuel consumption.

When the soundproof cover of the invention is produced, the sound-absorbing material 4 and the soft sound-insulating layer are first joined to each other. When the soft sound-insulating layer 5 is a hot-melt film, joining can be performed by thermocompression, which simplifies the production process. The soft sound-insulating layer 5 other than the hot-melt film is joined by using an appropriate adhesive agent.

Then, the soft cover 6 formed into a specified form is held in a state overlaid over the soft sound-insulating layer 5 at a specified gap therefrom, and surrounded with the sealing material so as to block the gap between the peripheral edge of the soft cover 6 and the peripheral edge of the soft sound-insulating layer 5, followed by connection thereof by thermocompression or the like. The air layer 8 is formed thereby.

Further, when the air layer 8 is filled with the air-permeable material 9, the air-permeable material 9 is placed on the soft sound-insulating layer 5 after the sound-absorbing material 4 is joined to the soft sound-insulating layer 5, and the soft cover 6 is placed on the air-permeable material 9. Then, the sealing material 7 is applied by thermocompression or the like.

Figure 3:
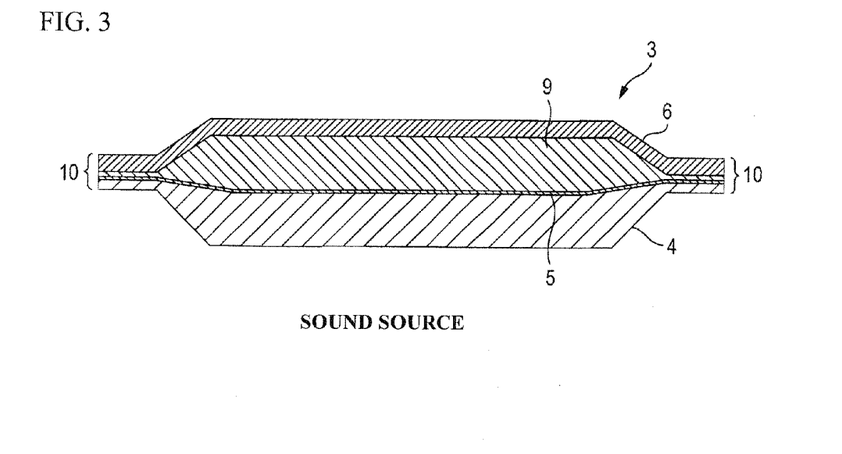
FIG. 3 is a cross-sectional view showing a still other example of the soundproof cover of the invention.

In the invention, various changes are possible. For example, the soft cover 6 and the soft sound-insulating layer 5 can be directly connected without using the sealing material 7 as shown in FIG. 3. In that case, the peripheral edge of the soft cover 6 is brought into abutting contact with the peripheral edge of the soft sound-insulating layer 5, and the abutting contact portion is thermocompressed (hot-press adhered 10). Further, when the air layer 8 is filled with the air-permeable material 9, the air-permeable material 9 and the soft cover 6 are in turn placed on the soft sound-insulating layer 5 to form a laminate after the sound-absorbing material 4 is joined to the soft sound-insulating layer 5, and the whole laminate is thermocompressed along the peripheral edge thereof.

Further, in order to fix the soft cover 6 to the sound source such as the engine, through holes arriving at the sound-absorbing material 4 are formed in the soft cover in some cases. In that case, holes having the same diameter as the through holes are also made in the soft cover 6 and the soft sound-insulating layer 5, and linearly connected to form through holes.

In the soundproof cover of the invention, the sound-absorbing material 4 may be disposed either apart from the sound source, or in contact with the sound source. For example, when the soundproof cover is mounted on the engine, the vibration of the engine is transmitted to the soundproof cover. The conventional soundproof cover provided with the rigid cover cannot absorb the vibration of the engine because the rigid cover is not deformed, so that it becomes necessary to form a gap of about 5 to about 20 mm between the soundproof cover and the engine. Compared with this, in the soundproof cover of the invention, the soft cover 6 is deformed to be able to adsorb the vibration, so that the soundproof cover can be disposed in contact with the sound source as described above. As a result, space saving can be achieved, or in the case where the space consumption is the same, the sound-absorbing material 4 can be thickened, which makes it possible to enhance soundproof characteristics. Further, the phenomenon of amplifying standing waves by interference can be inhibited by eliminating the gap between the soundproof cover and the engine, and therefore the soundproof effect can be further expected.

EXAMPLES

The invention will be described in greater detail with reference to the following Examples and Comparative Examples, but the invention should not be construed as being limited thereto. Incidentally, the air permeability was measured according to JIS L 1018 (1999), and the Young's modulus was measured according to JIS K 7127 (1999). Further, the basis weight is given by the mass per square meter.

Comparative Example 1

A substrate, which was prepared by shaping PET short fibers having a basis weight of 150 g/m² with a vinyl acetate resin emulsion (solid content: 30 g/m²) according to chemical bonding, was laminated on a skin material made of polypropylene long fibers, which was prepared according to a spun-bonding method, to obtain a nonwoven fabric having a basis weight of 220 g/m². On the skin material side of the nonwoven fabric, 250 g/m² of moisture-curable urethane resin was roller coated to prepare a sheet material having a Young's modulus of 1.2 GPa, an air permeability of 0.01 cc/cm²·sec and a basis weight of 500 g/m². This sheet material as a soft cover 6, disposed so that the moisture-curable urethane resin was positioned on the inside, a PET felt having a basis weight of 250 g/m² as an air-permeable material 9 as an air layer 8, a hot-melt film (thickness: 30 μm, Young's modulus: 0.08 GPa, air permeability: 0.01 cc/cm²·sec) formed from low molecular weight polyurethane as a soft sound-insulating layer 5 and a PET felt having a basis weight of 500 g/m² as a sound-absorbing material 4 were laminated and shaped to a thickness of 20 mm by hot press at 170° C., thereby obtaining a soundproof cover.

Comparative Example 2

A substrate, which was prepared by shaping PET short fibers having a basis weight of 150 g/m² with a vinyl acetate resin emulsion (solid content: 30 g/m²) according to chemical bonding, was laminated on a skin material made of polypropylene long fibers, which was prepared according to a spun-bonding method, to obtain a nonwoven fabric having a basis weight of 220 g/m². On the skin material side of the nonwoven fabric, a hot-melt film having a thickness of 60 μm formed from low molecular weight polyurethane was laminated to prepare a sheet material having a Young's modulus of 1.0 GPa, an air permeability of 0.01 cc/cm²·sec and a basis weight of 300 g/m². This sheet material as a soft cover 6, disposed so that the hot-melt film was positioned on the inside, a PET felt having a basis weight of 250 g/m² as an air-permeable material 9 as an air layer 8, a hot-melt film (thickness: 30 Young's modulus: 0.08 GPa, air permeability: 0.01 cc/cm²·sec) formed from low molecular weight polyurethane as a soft sound-insulating layer 5 and a PET felt having a basis weight of 500 g/m² as a sound-absorbing material 4 were laminated and shaped to a thickness of 20 mm by hot press at 170° C., thereby obtaining a soundproof cover.

Comparative Example 3

A substrate, which was prepared by shaping PET short fibers having a basis weight of 150 g/m² with a vinyl acetate resin emulsion (solid content: 30 g/m²) according to chemical bonding, was laminated on a skin material made of polypropylene long fibers, which was prepared according to a spun-bonding method, to obtain a nonwoven fabric having a basis weight of 220 g/m². On the skin material side of the nonwoven fabric, a 30 μm thick hot-melt film formed from low molecular weight polyurethane was laminated to prepare a sheet material having a Young's modulus of 0.6 GPa, an air permeability of 0.01 cc/cm²·sec and a basis weight of 260 g/m². This sheet material as a soft cover 6, disposed so that the hot-melt film was positioned on the inside, a PET felt having a basis weight of 250 g/m² as an air-permeable material 9 as an air layer 8, a hot-melt film (thickness: 30 μm, Young's modulus: 0.08 GPa, air permeability: 0.01 cc/cm²·sec) formed from low molecular weight polyurethane as a soft sound-insulating layer 5 and a PET felt having a basis weight of 500 g/m² as a sound-absorbing material 4 were laminated and shaped to a thickness of 20 mm by hot press at 170° C., thereby obtaining a soundproof cover.

Example 1

A peripheral edge of the soundproof cover of Comparative Example 1 was sealed with a hot-melt film (thickness: 30 μm) formed from low molecular weight polyurethane as a sealing material 7 to obtain a soundproof cover with the air layer 8 hermetically sealed.

Example 2

A peripheral edge of the soundproof cover of Comparative Example 2 was sealed with a hot-melt film (thickness: 30 μm) formed from low molecular weight polyurethane as a sealing material 7 to obtain a soundproof cover with the air layer 8 hermetically sealed.

Example 3

A peripheral edge of the soundproof cover of Comparative Example 3 was sealed with a hot-melt film (thickness: 30 μm) formed from low molecular weight polyurethane as a sealing material 7 to obtain a soundproof cover with the air layer 8 hermetically sealed.

Example 4

The peripheral edge of the formed body (thickness: 20 mm) as the soundproof cover obtained in Comparative Example 1 was compressed to 1.5 mm by hot press molding to obtain a soundproof cover with the air layer 8 hermetically sealed.

Example 5

A soundproof cover with the air layer 8 hermetically sealed was obtained by using the same materials and production method as in Example 1 with the exception that the peripheral edge of the soundproof cover was sealed with a hot-melt film (thickness: 30 μm) formed from low molecular weight polyurethane as a sealing material 7 as a gap of 10 mm was formed between the soft cover 6 and the soft sound-insulating layer 5 without using the PET felt (basis weight: 250 g/m²) as an air-permeable material 9 as an air layer 8.

Comparative Example 4

A soundproof cover with the air layer 8 hermetically sealed was obtained by using the same materials and production method as in Example 1 with the exception that a nonwoven fabric (basis weight: 220 g/m², Young's modulus: 0.08 GPa, air permeability: 12.5 cc/cm²·sec) was used as the soft sound-insulating layer 5.

Comparative Example 5

A soundproof cover was obtained by using the same materials and production method as in Example 1 with the exception that the soft cover 6 was closely contacted to the soft sound-insulating layer 5 without using the PET felt (basis weight: 250 g/m²) as an air-permeable material 9 as an air layer 8 and that the thickness of the sound-absorbing material 4 was changed to 20 mm.

Comparative Example 6

A soundproof cover with the air layer 8 hermetically sealed was obtained by using the same materials and production method as in Example 1 with the exception that a 2 mm thick polypropylene (PP) plate (basis weight: 2,400 g/m², Young's modulus: 2.0 GPa, air permeability: 0 cc/cm²·sec) as a rigid cover in place of the soft cover 6.

Example 6

A soundproof cover with the air layer 8 hermetically sealed was obtained by using the same materials and production method as in Example 1 with the exception that a sheet material (basis weight: 350 g/m², Young's modulus: 0.3 GPa, air permeability: 0.5 cc/cm²·sec) obtained by roller coating 130 g/m² of moisture-curable polyurethane resin on the skin material side of the nonwoven fabric having a basis weight of 220 g/m² obtained by laminating the substrate prepared by shaping PET short fibers having a basis weight of 150 g/m² with the vinyl acetate resin emulsion (solid content: 30 g/m²) according to chemical bonding on the skin material made of polypropylene long fibers, which was prepared according to a spun-bonding method, was used as the soft sound-insulating layer 5.

Constitution of the respective soundproof covers of the above-mentioned Examples and Comparative Examples is shown in Table 1, Table 2 and Table 3. Further, the following measurement of an acoustic characteristic and confirmation of secondary emission of the soft covers were made for the respective soundproof covers.

TABLE 1

Figure 4:
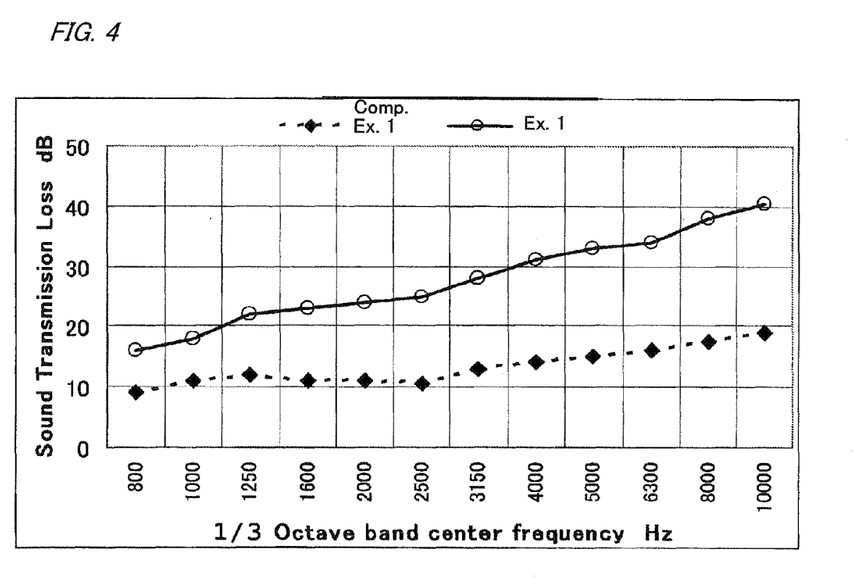
FIG. 4 is a graph showing the soundproof characteristics of Example 1 and Comparative Example 1.
Figure 5:
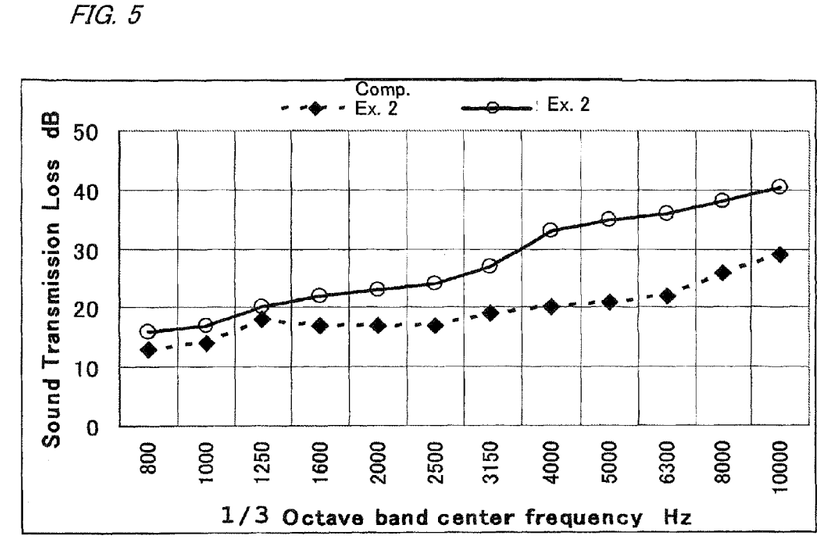
FIG. 5 is a graph showing the soundproof characteristics of Example 2 and Comparative Example 2.
Figure 6:
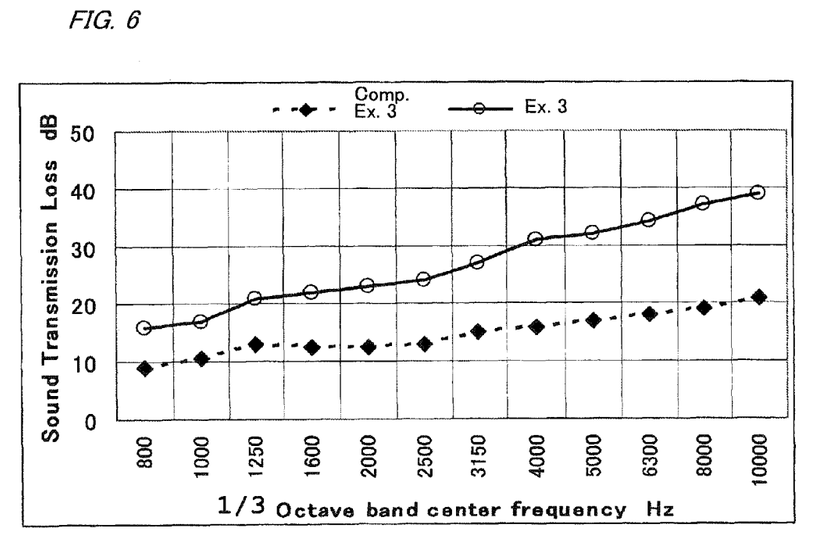
FIG. 6 is a graph showing the soundproof characteristics of Example 3 and Comparative Example 3.

|  | Comparative Example 1 | Comparative Example 2 | Comparative Example 3 |
|---|---|---|---|
| Soft Cover | Polymer coated nonwoven fabric (basis weight: 500 g/m²) | Nonwoven fabric + hot melt film 60 μm (basis weight: 300 g/m²) | Nonwoven fabric + hot melt film 30 μm (basis weight: 260 g/m²) |
| Young's Modulus of Soft Cover (GPa) | 1.2 | 1.0 | 0.6 |
| Air Permeation of Soft Cover (cc/cm²·sec) | 0.01 | 0.01 | 0.01 |
| Air Layer | PET felt 10 mm (basis weight: 250 g/m²) | PET felt 10 mm (basis weight: 250 g/m²) | PET felt 10 mm (basis weight: 250 g/m²) |
| Seal of Peripheral Edge | Not sealed | Not sealed | Not sealed |
| Soft Sound-Insulating Layer | Hot melt film 30 μm | Hot melt film 30 μm | Hot melt film 30 μm |
| Air Permeation of Soft Sound-Insulating Layer (cc/cm²·sec) | 0.01 | 0.01 | 0.01 |
| Young's Modulus of Soft Sound-Insulating Layer (GPa) | 0.08 | 0.08 | 0.08 |
| Sound-Absorbing Material | PET felt 10 mm (basis weight: 500 g/m²) | PET felt 10 mm (basis weight: 500 g/m²) | PET felt 10 mm (basis weight: 500 g/m²) |
| Ratio of Young's Modulus | 0.07 (1/15) | 0.08 (1/12.5) | 0.13 (1/7.5) |
| Soundproof Cover Mass (g/m²) | 1,290 | 1,090 | 1,050 |
| Sound Transmission Loss | FIG. 4 | FIG. 5 | FIG. 6 |
| Decrease in Secondary Emission of Soft Cover | A | A | A |

|  | Example 1 | Example 2 | Example 3 |
|---|---|---|---|
| Soft Cover | Polymer coated nonwoven fabric (basis weight: 500 g/m²) | Nonwoven fabric + hot melt film 60 μm (basis weight: 300 g/m²) | Nonwoven fabric + hot melt film 30 μm (basis weight: 260 g/m²) |
| Young's Modulus of Soft Cover (GPa) | 1.2 | 1.0 | 0.6 |
| Air Permeation of Soft Cover (cc/cm²·sec) | 0.01 | 0.01 | 0.01 |
| Air Layer | PET felt 10 mm (basis weight: 250 g/m²) | PET felt 10 mm (basis weight: 250 g/m²) | PET felt 10 mm (basis weight: 250 g/m²) |
| Seal of Peripheral Edge | Hot melt film 30 μm | Hot melt film 30 μm | Hot melt film 30 μm |
| Soft Sound-Insulating Layer | Hot melt film 30 μm | Hot melt film 30 μm | Hot melt film 30 μm |
| Air Permeation of Soft Sound-Insulating Layer (cc/cm²·sec) | 0.01 | 0.01 | 0.01 |
| Young's Modulus of Soft Sound-Insulating Layer (GPa) | 0.08 | 0.08 | 0.08 |
| Sound-Absorbing Material | PET felt 10 mm (basis weight: 500 g/m²) | PET felt 10 mm (basis weight: 500 g/m²) | PET felt 10 mm (basis weight: 500 g/m²) |
| Ratio of Young's Modulus | 0.07 (1/15) | 0.08 (1/12.5) | 0.13 (1/7.5) |
| Soundproof Cover Mass (g/m²) | 1,320 | 1,120 | 1,080 |
| Sound Transmission Loss | FIG. 4 | FIG. 5 | FIG. 6 |
| Decrease in Secondary Emission of Soft Cover | A | A | A |

TABLE 1-continued

Figure 7:
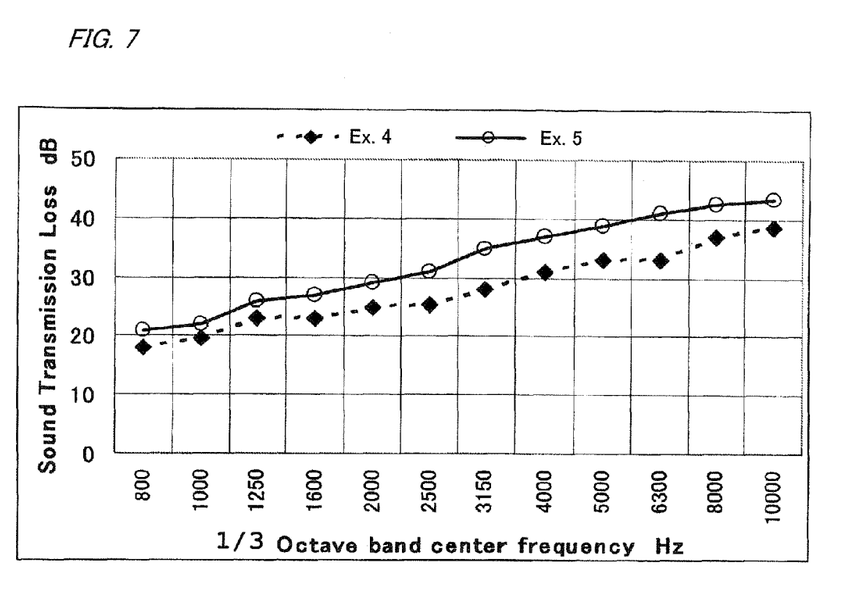
FIG. 7 is a graph showing the soundproof characteristics of Example 4 and Example 5.

|  | Example 4 | Example 5 |
|---|---|---|
| Soft Cover | Polymer coated nonwoven fabric (basis weight: 500 g/m$^2$) | Polymer coated nonwoven fabric (basis weight: 300 g/m$^2$) |
| Young's Modulus of Soft Cover (GPa) | 1.2 | 1.2 |
| Air Permeation of Soft Cover (cc/cm$^2$ · sec) | 0.01 | 0.01 |
| Air Layer | PET felt 10 mm (basis weight: 250 g/m$^2$) | Only air |
| Seal of Peripheral Edge | Peripheral edge was compression sealed | Hot melt film 30 μm |
| Soft Sound-Insulating Layer | Hot melt film 30 μm | Hot melt film 30 μm |
| Air Permeation of Soft Sound-Insulating Layer (cc/cm$^2$ · sec) | 0.01 | 0.01 |
| Young's Modulus of Soft Sound-Insulating Layer (GPa) | 0.08 | 0.08 |
| Sound-Absorbing Material | PET felt 10 mm (basis weight: 500 g/m$^2$) | PET felt 10 mm (basis weight: 500 g/m$^2$) |
| Ratio of Young's Modulus | 0.07 (1/15) | 0.07 (1/15) |
| Soundproof Cover Mass (g/m$^2$) | 1,290 | 1,170 |
| Sound Transmission Loss | FIG. 7 | FIG. 7 |
| Decrease in Secondary Emission of Soft Cover | A | A |

Note:
Ratio of Young's modulus: Young's modulus of the soft sound-insulating layer/Young's modulus of the soft cover

TABLE 2

Figure 8:
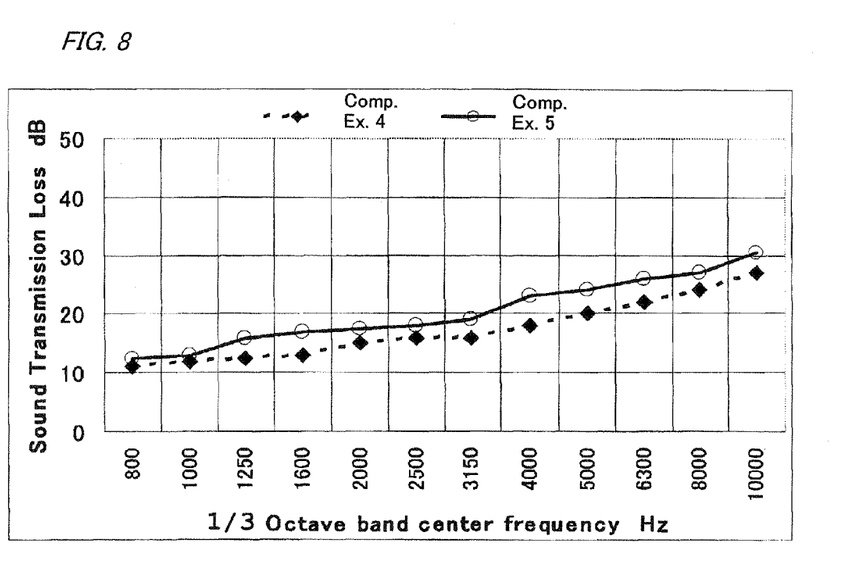
FIG. 8 is a graph showing the soundproof characteristics of Comparative Example 4 and Comparative Example 5.

|  | Example 1 | Comparative Example 4 | Comparative Example 5 |
|---|---|---|---|
| Soft Cover | Polymer coated nonwoven fabric (basis weight: 500 g/m$^2$) | Polymer coated nonwoven fabric (basis weight: 500 g/m$^2$) | Polymer coated nonwoven fabric (basis weight: 500 g/m$^2$) |
| Young's Modulus of Soft Cover (GPa) | 1.2 | 1.2 | 1.2 |
| Air Permeation of Soft Cover (cc/cm$^2$ · sec) | 0.01 | 0.01 | 0.01 |
| Air Layer | PET felt 10 mm (basis weight: 250 g/m$^2$) | PET felt 10 mm (basis weight: 250 g/m$^2$) | Not formed |
| Seal of Peripheral Edge | Hot melt film 30 μm | Hot melt film 30 μm | Hot melt film 30 μm |
| Soft Sound-Insulating Layer | Hot melt film 30 μm | Nonwoven fabric (basis weight: 220 g/m$^2$) | Hot melt film 30 μm |
| Air Permeation of Soft Sound-Insulating Layer (cc/cm$^2$ · sec) | 0.01 | 12.5 | 0.01 |
| Young's Modulus of Soft Sound-Insulating Layer (GPa) | 0.08 | 0.08 | 0.08 |
| Sound-Absorbing Material | PET felt 10 mm (basis weight: 500 g/m$^2$) | PET felt 10 mm (basis weight: 500 g/m$^2$) | PET felt 20 mm (basis weight: 1,000 g/m$^2$) |
| Ratio of Young's Modulus | 0.07 (1/15) | 0.07 (1/15) | 0.07 (1/15) |
| Soundproof Cover Mass (g/m$^2$) | 1,320 | 1,490 | 1,570 |
| Sound Transmission Loss | FIG. 4 | FIG. 8 | FIG. 8 |
| Decrease in Secondary Emission of Soft Cover | A | A | A |

Figure 9:
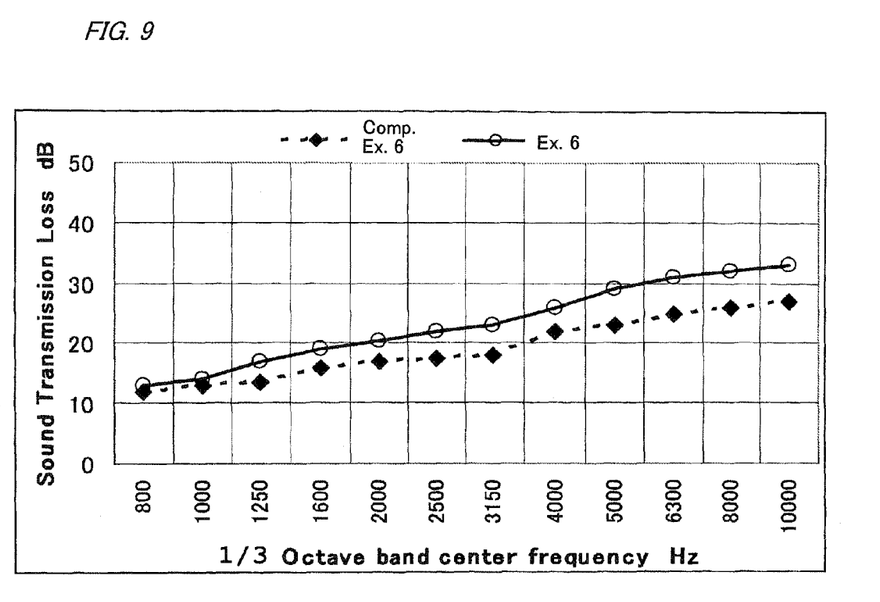
FIG. 9 is a graph showing the soundproof characteristics of Example 6 and Comparative Example 6.

|  | Comparative Example 6 | Comparative Example 1 |
|---|---|---|
| Soft Cover | Hard cover (polypropylene plate 2 mm) (basis weight: 2,400 g/m$^2$) | Polymer coated nonwoven fabric (basis weight: 300 g/m$^2$) |
| Young's Modulus of Soft Cover (GPa) | 2.0 | 1.2 |
| Air Permeation of Soft Cover (cc/cm$^2$ · sec) | 0 | 0.01 |
| Air Layer | PET felt 10 mm (basis weight: 250 g/m$^2$) | PET felt 10 mm (basis weight: 250 g/m$^2$) |
| Seal of Peripheral Edge | Hot melt film 30 μm | Not sealed |
| Soft Sound-Insulating Layer | Hot melt film 30 μm | Hot melt film 30 μm |
| Air Permeation of Soft Sound-Insulating Layer (cc/cm$^2$ · sec) | 0.01 | 0.01 |
| Young's Modulus of Soft Sound-Insulating Layer (GPa) | 0.08 | 0.08 |
| Sound-Absorbing Material | PET felt 10 mm (basis weight: 500 g/m$^2$) | PET felt 10 mm (basis weight: 500 g/m$^2$) |
| Ratio of Young's Modulus | 0.04 (1/25) | 0.07 (1/15) |
| Soundproof Cover Mass (g/m$^2$) | 3,220 | 1,290 |
| Sound Transmission Loss | FIG. 9 | FIG. 4 |
| Decrease in Secondary Emission of Soft Cover | C | A |

Note:
Ratio of Young's modulus: Young's modulus of the soft sound-insulating layer/Young's modulus of the soft cover

TABLE 3

|  | Example 1 | Example 2 | Example 3 | Example 6 |
|---|---|---|---|---|
| Soft Cover | Polymer coated nonwoven fabric (basis weight: 500 g/m$^2$) | Nonwoven fabric + hot melt film 60 μm (basis weight: 300 g/m$^2$) | Nonwoven fabric + hot melt film 30 μm (basis weight: 260 g/m$^2$) | Polymer coated nonwoven fabric (basis weight: 500 g/m$^2$) |
| Young's Modulus of Soft Cover (GPa) | 1.2 | 1.0 | 0.6 | 1.2 |
| Air Permeation of Soft Cover (cc/cm$^2$ · sec) | 0.01 | 0.01 | 0.01 | 0.01 |
| Air Layer | PET felt 10 mm (basis weight: 250 g/m$^2$) | PET felt 10 mm (basis weight: 250 g/m$^2$) | PET felt 10 mm (basis weight: 250 g/m$^2$) | PET felt 10 mm (basis weight: 250 g/m$^2$) |
| Seal of Peripheral Edge | Hot melt film 30 μm | Hot melt film 30 μm | Hot melt film 30 μm | Hot melt film 30 μm |
| Soft Sound-Insulating Layer | Hot melt film 30 μm | Hot melt film 30 μm | Hot melt film 30 μm | Polymer coated nonwoven fabric (basis weight: 350 g/m$^2$) |
| Air Permeation of Soft Sound-Insulating Layer (cc/cm$^2$ · sec) | 0.01 | 0.01 | 0.01 | 0.50 |
| Young's Modulus of Soft Sound-Insulating Layer (GPa) | 0.08 | 0.08 | 0.08 | 0.3 |
| Sound-Absorbing Material | PET felt 10 mm (basis weight: 500 g/m$^2$) | PET felt 10 mm (basis weight: 500 g/m$^2$) | PET felt 10 mm (basis weight: 500 g/m$^2$) | PET felt 10 mm (basis weight: 500 g/m$^2$) |
| Ratio of Young's Modulus | 0.07 (1/15) | 0.08 (1/12.5) | 0.13 (1/7.5) | 0.25 (1/4) |
| Soundproof Cover Mass (g/m$^2$) | 1,320 | 1,120 | 1,080 | 1,630 |
| Sound Transmission Loss | FIG. 4 | FIG. 5 | FIG. 6 | FIG. 9 |
| Decrease in Secondary Emission of Soft Cover | A | A | A | A |

Note:
Ratio of Young's modulus: Young's modulus of the soft sound-insulating layer/Young's modulus of the soft cover.

(Measurement of Acoustic Characteristic)

The sound transmission loss of the respective soundproof covers of Examples and Comparative Examples was measured by a small reverberation box (diffuse sound field)-anechoic room (free sound field)-acoustic intensity method. The results thereof are shown in FIGS. 4 to 9.

(Confirmation of Secondary Emission of Soft Cover)

At the time of measurement of the acoustic characteristic, vibration (white noise) was supplied into the soft cover through fastening points from a shaker, and secondary emission of the soft cover was confirmed. The soft cover in which the change in sound pressure level of transmitted sound between the presence and absence of vibrational input was less than 1 dB was evaluated as A, the soft cover in which the change was from 1 dB to less than 3 dB was evaluated as B, and the soft cover in which the change was 3 dB or more was evaluated as C. The results are shown in Tables 1 to 3.

As shown in Table 1, it is known that the soundproof covers of Examples 1 to 3 in which the air layers were hermetically sealed by sealing the peripheral edges show a very high sound transmission loss (sound-insulating performance), compared with the soundproof covers of Comparative Examples 1 to 3. The reason for this is possibly that in a closed space formed by blocking the gap between the soft cover 6 and the soft sound-insulating layer 5 with the sealing material 7, sound waves (compressional waves) supplied through the sound-absorbing material 4 are consumed in selectively performing vibration deformation of the soft sound-insulating layer 5 which is more easily deformable by pressure fluctuation, according to the air spring effect, resulting in a decrease in the sound waves supplied into the soft cover 6. Further, the soundproof cover of Example 4, in which the air layer 8 was hermetically sealed by sealing the peripheral edge by compression according to press molding, provided sound-insulating performance equivalent to that of the soundproof covers of Examples 1 to 3.

As shown in Table 2, according to the soundproof cover of Comparative Example 4 in which the air permeability of the soft sound-insulating layer 5 is high and the airflow quantity is large, the sound waves supplied through the sound-absorbing material 4 are transmitted without performing vibration deformation of the soft sound-insulating layer 5, so that the vibration-damping effect is not obtained, resulting in a failure to obtain high sound-insulating performance. Further, according to the soundproof cover of Comparative Example 5 having no air layer, vibration of the soft sound-insulating layer 5 is directly transmitted to the soft cover 6, so that no high sound-insulating effect is obtained. Furthermore, according to the soundproof cover of Comparative Example 6, high sound-insulating performance is obtained, but secondary emission occurred from the rigid cover by vibration transmitted from fastening points (fixing points).

As shown in Table 3, the soundproof cover of Example 6 having a Young's modulus ratio of the soft sound-insulating layer 5 to the soft cover 6 of ¼ shows intermediate sound-insulating performance between the soundproof covers of Comparative Examples 1 to 6 and the soundproof covers of Examples 1 to 5. However, compared with the soundproof covers of Examples 1 to 5 in which the sound transmission loss shows an increase exceeding an approximate curve (increases with an increase in frequency at a rate of 3 dB/octave) of the mass law in a frequency region of 2 kHz or more, this effect is not obtained.

While the invention has been described in detail and with reference to specific embodiments thereof, it will be apparent to one skilled in the art that various changes and modifications can be made therein without departing from the sprit and scope thereof.

This application is based on Japanese patent application No. 2009-217003 filed on Sep. 18, 2009, the entire contents of which are incorporated hereinto by reference. All references cited herein are incorporated in their entirety.

What is claimed is:

1. A soundproof cover comprising:
    a sound-absorbing material disposed facing to a sound source such that sound from the sound source first impinges the sound-absorbing material;
    a soft sound-insulating layer laminated on the sound-absorbing material and having an air permeability measured according to JIS L 1018 (1999) of 10 cc/cm$^2$·sec or less; and
    a soft cover forming an air layer with the soft sound-insulating layer and having a Young's modulus measured according to JIS K 7127 (1999) of 0.2 to 1.5 GPa,
    wherein the soft sound-insulating layer has a Young's modulus measured according to JIS K 7127 (1999) of $1/5$ or less than that of the soft cover, and wherein the air layer is hermetically sealed.

2. The soundproof cover according to claim 1, wherein the air layer is filled with an air-permeable material having a basis weight of 50-500 g/m$^2$.

3. The soundproof cover according to claim 1, wherein the soft cover and the soft sound-insulating layer have peripheral edges which are in contact with each other, and the peripheral edges are pressure-bonded with each other.

4. The soundproof cover according to claim 1, wherein the soft cover and the soft sound-insulating layer have peripheral edges which are connected to each other, directly or with a sealing material.

5. A method for producing a soundproof cover comprising the steps:
    shaping a soft cover having a Young's modulus measured according to JIS K 7127 (1999) of 0.2 to 1.5 GPa;
    shaping a laminate of a sound-absorbing material and a soft sound-insulating layer having an air permeability measured according to JIS L 1018 (1999) of 10 cc/cm$^2$·sec or less;
    overlaying the laminate over the soft cover so that the soft sound-insulating layer faces to the soft cover with a gap therebetween, thereby forming an air layer between the soft sound-insulating layer and the soft cover; and
    connecting the soft cover to the soft sound-insulating layer at peripheral edges thereof,
    wherein the soft sound-insulating layer has a Young's modulus measured according to JIS K 7127 (1999) of $1/5$ or less than that of the soft cover.

6. A sound reduction method comprising disposing the soundproof cover according to claim 1 on an engine in an engine room of an automobile, so that the sound-absorbing material contacts with the engine.

* * * * *